US010600174B2

(12) United States Patent
Wang

(10) Patent No.: US 10,600,174 B2
(45) Date of Patent: Mar. 24, 2020

(54) OPTICAL INSPECTION APPARATUS

(71) Applicant: Test Research, Inc., Taipei (TW)

(72) Inventor: Yeong-Feng Wang, Taipei (TW)

(73) Assignee: Test Research, Inc., Taipei (TW)

( * ) Notice: Subject to any disclaimer, the term of this patent is extended or adjusted under 35 U.S.C. 154(b) by 353 days.

(21) Appl. No.: 14/983,470

(22) Filed: Dec. 29, 2015

(65) Prior Publication Data

US 2017/0186150 A1 Jun. 29, 2017

(51) Int. Cl.
*H04N 9/47* (2006.01)
*G06T 7/00* (2017.01)
*H04N 5/225* (2006.01)
*G02B 5/20* (2006.01)
*G02B 27/10* (2006.01)
*G02B 27/14* (2006.01)

(52) U.S. Cl.
CPC ......... *G06T 7/0006* (2013.01); *H04N 5/2254* (2013.01); *H04N 5/2256* (2013.01); *G02B 5/20* (2013.01); *G02B 27/1006* (2013.01); *G02B 27/141* (2013.01); *G06T 2207/30148* (2013.01)

(58) Field of Classification Search
CPC ................ G02B 21/125; G02B 21/002; G02B 21/0016; G02B 21/06; G02B 21/082; G02B 27/0994; G01N 21/9501; G01N 21/4738; G01N 21/6489; G01N 21/88; G01N 21/8806; G01N 21/909; G01N 21/9503; G01N 21/956; G01N 21/95684; G01B 11/026; G01B 11/0608
USPC ....................................................... 348/126
See application file for complete search history.

(56) References Cited

U.S. PATENT DOCUMENTS

| | | | | |
|---|---|---|---|---|
| 5,030,823 A | * | 7/1991 | Obdeijn | G01N 21/909 250/223 B |
| 6,005,965 A | * | 12/1999 | Tsuda | G01N 21/95684 250/559.08 |
| 6,633,376 B1 | * | 10/2003 | Nishida | G01N 21/88 356/237.5 |
| 6,657,216 B1 | * | 12/2003 | Poris | G01B 11/0608 250/216 |
| 7,356,176 B2 | | 4/2008 | Fujii et al. | |
| 7,394,084 B2 | | 7/2008 | Kuriyama et al. | |
| 2004/0207836 A1 | * | 10/2004 | Chhibber | G01N 21/4738 356/237.4 |

(Continued)

FOREIGN PATENT DOCUMENTS

CN 1198135 C 4/2005
CN 101699128 A 4/2010

(Continued)

*Primary Examiner* — Masum Billah
(74) *Attorney, Agent, or Firm* — CKC & Partners Co., LLC

(57) ABSTRACT

An optical inspection apparatus includes a dichroic mirror, a first light source, and a first image capturing device. The dichroic mirror has a first side and a second side opposite to the first side. The dichroic mirror transmits a first light beam and reflects a second light beam. The wavelength of the second light beam is different from the wavelength of the first light beam. The first light source is disposed at the first side of the dichroic mirror and is configured to provide the first light beam to pass through the dichroic mirror. The first image capturing device is disposed at the second side of the dichroic mirror and is configured to detect the second light beam reflected from the dichroic mirror.

9 Claims, 5 Drawing Sheets

(56) References Cited

U.S. PATENT DOCUMENTS

| | | | | |
|---|---|---|---|---|
| 2010/0171955 | A1* | 7/2010 | Suga | G01B 11/026 |
| | | | | 356/364 |
| 2013/0043405 | A1 | 2/2013 | Maxwell | |
| 2013/0265459 | A1* | 10/2013 | Duparre | H04N 5/23238 |
| | | | | 348/218.1 |
| 2015/0168304 | A1 | 6/2015 | Wouters et al. | |
| 2015/0168311 | A1* | 6/2015 | Seki | G01N 21/6489 |
| | | | | 356/51 |

FOREIGN PATENT DOCUMENTS

| | | | |
|---|---|---|---|
| CN | 101913105 A | | 12/2010 |
| CN | 102052950 A | | 5/2011 |
| CN | 102213680 A | | 10/2011 |
| CN | 102564328 A | | 7/2012 |
| CN | 103335819 A | | 10/2013 |
| CN | 103430013 A | | 12/2013 |
| CN | 103438831 A | | 12/2013 |
| EP | 1061330 A1 | | 12/2000 |
| JP | 2004-101533 A | | 4/2004 |
| JP | 2007538238 A | | 12/2007 |
| JP | 2010-509993 A | | 4/2010 |
| JP | 2012-104532 A | | 5/2012 |
| TW | 201321713 A | | 6/2013 |
| TW | 201321713 A | * | 6/2013 |
| TW | 201348894 A | | 12/2013 |
| TW | 201425863 A | | 7/2014 |
| WO | WO2006001127 A1 | | 1/2006 |
| WO | WO2015030678 A1 | | 3/2015 |
| WO | 2015053712 A1 | | 4/2015 |

* cited by examiner

OPTICAL INSPECTION APPARATUS

BACKGROUND

Field of Disclosure

The present disclosure relates to an optical inspection apparatus.

Description of Related Art

A semiconductor chip is fabricated by forming an integrated circuit on a semiconductor wafer. The uppermost surface of the semiconductor chip is generally protected by the deposition of a passivation layer. The passivation layer can prevent the semiconductor chip from suffering undesirable moisture and ionic contaminants. To detect the thickness and the uniformity of the passivation layer, the wafer can be inspected using an inspection apparatus.

SUMMARY

An aspect of the present disclosure is to provide an optical inspection apparatus including a dichroic mirror, a first light source, and a first image capturing device. The dichroic mirror has a first side and a second side opposite to the first side. The dichroic mirror transmits a first light beam and reflects a second light beam. The wavelength of the second light beam is different from the wavelength of the first light beam. The first light source is disposed at the first side of the dichroic mirror and is configured to provide the first light beam to pass through the dichroic mirror. The first image capturing device is disposed at the second side of the dichroic mirror and is configured to detect the second light beam reflected from the dichroic mirror.

Another aspect of the present disclosure is to provide an optical inspection apparatus including a first light source, a dichroic mirror, a first image capturing device, and a second light source. The first light source provides a first light beam to an inspection position. The first light source and the inspection position form an optical axis. The dichroic mirror is disposed in the optical axis and has a first side and a second side opposite to the first side. The first light beam passes through the dichroic mirror from the first side to the inspection position. The first image capturing device is disposed outside the optical axis and is configured to detect a second light beam reflected from the second side of the dichroic mirror. The second light beam comes from the inspection position and has a wavelength different from the first light beam. The first light source is coaxial with the first image capturing device. The second light source is configured to provide a third light beam to the inspection position. A path of the third light beam is spaced from the dichroic mirror.

DETAILED DESCRIPTION

Figure 1:
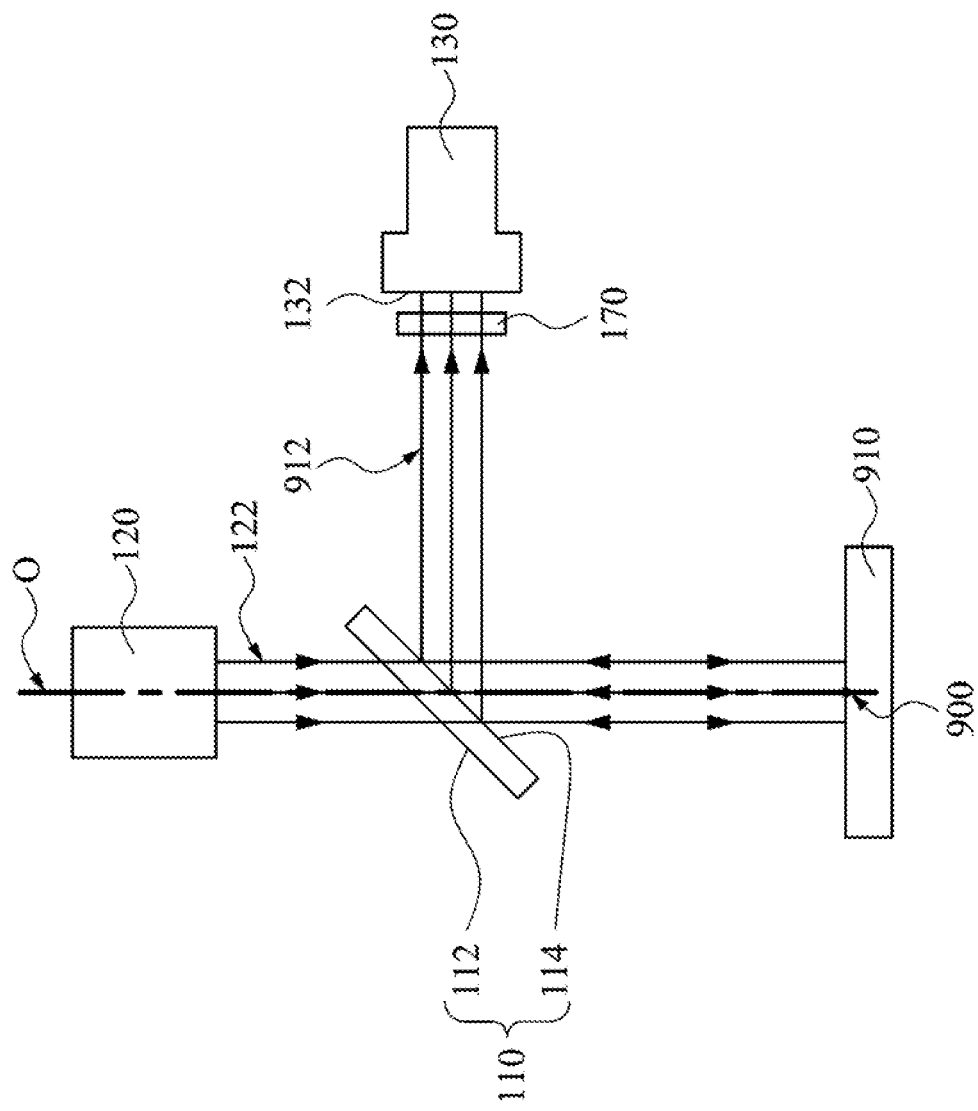
FIG. 1 is a schematic diagram of an optical inspection apparatus according to one embodiment of the present disclosure.

Reference will now be made in detail to the present embodiments of the disclosure, examples of which are illustrated in the accompanying drawings. Wherever possible, the same reference numbers are used in the drawings and the description to refer to the same or like parts.

FIG. 1 is a schematic diagram of an optical inspection apparatus according to one embodiment of the present disclosure. The optical inspection apparatus includes a dichroic mirror 110, a first light source 120, and a first image capturing device 130. The dichroic mirror 110 has a first side 112 and a second side 114 opposite to the first side 112. The dichroic mirror 110 transmits a first light beam 122 and reflects a second light beam 912. The wavelength of the second light beam 912 is different from the wavelength of the first light beam 122. The first light source 120 is disposed at the first side 112 of the dichroic mirror 110 and is configured to provide the first light beam 122 to pass through the dichroic mirror 110. The first image capturing device 130 is disposed at the second side 114 of the dichroic mirror 110 and is configured to detect the second light beam 912 reflected from the dichroic mirror 110.

In some embodiments, the optical inspection apparatus can inspect a sample 910 having a wavelength converting layer (not shown), which can convert the first light beam 122 into the second light beam 912. Therefore, during the inspection process, the first light source 120 emits the first light beam 122, which passes through the dichroic mirror 110 and then impinges on the sample 910. The wavelength converting layer of the sample 910 coverts the first light beam 122 into the second light beam 912, and the second light beam 912 propagates back to the dichroic mirror 110. The dichroic mirror 110 then reflects the second light beam 912 to the first image capturing device 130, such that the first image capturing device 130 can receive the image of the sample 910.

Since the optical inspection apparatus of present embodiment uses the dichroic mirror 110 to arrange the light paths of the first light beam 122 and the second light beam 912, the first light beam 122 and the second light beam 912 may have low, even substantially zero energy loss. In other words, the energy of the first light beam 122 and the second light beam 912 can be effectively utilized. Moreover, since the first image capturing device 130 detects the second light beam 912 reflected from the dichroic mirror 110, the image of the sample 910 does not have a chromatic aberration problem, which is due to the dispersion of light when a light beam passes through a material. Therefore, the image can be directly analyzed without performing an image compensation process.

In some embodiments, the dichroic mirror 110 can be a short-pass filter or a band-pass filter, which can be formed by a combination of a short-pass filter and a long-pass filter. The short-pass filter transmits light below a certain wavelength and reflects (or blocks) light above that wavelength. The long-pass filter transmits light above a certain wavelength and reflects (or blocks) light below that wavelength. The band-pass filter transmits light in a certain wavelength range and reflects (or blocks) light outside that wavelength range.

Figure 2:
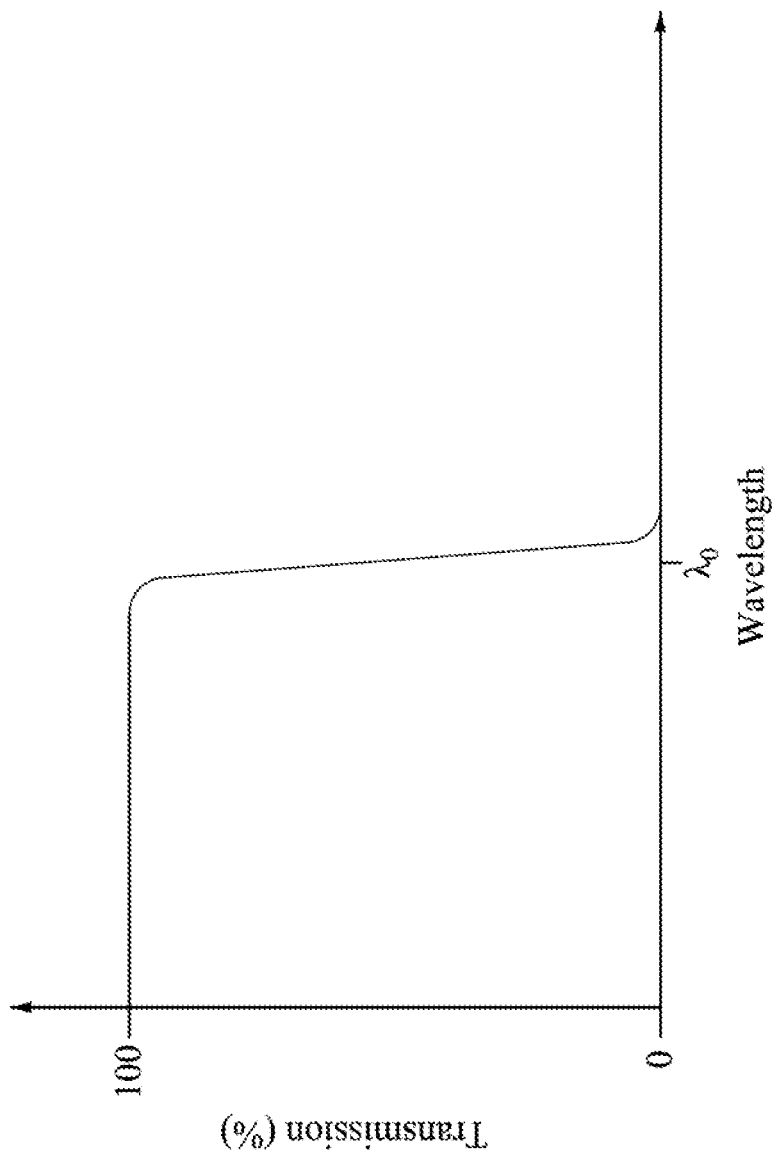
FIG. 2 is a transmission spectrum of the dichroic mirror of FIG. 1 in some embodiments.

FIG. 2 is a transmission spectrum of the dichroic mirror 110 of FIG. 1 in some embodiments. Reference is made to FIGS. 1 and 2. In FIG. 2, the dichroic mirror 110 is a short-band filter, which transmits light below a wavelength $\lambda_0$ and reflects (or blocks) light above the wavelength $\lambda_0$. In some embodiments, the first light beam 122 has a wavelength below the wavelength $\lambda_0$, and the second light beam 912 has a wavelength above the wavelength $\lambda_0$. In other words, the wavelength of the first light beam 122 is shorter than the wavelength of the second light beam. As shown in FIG. 2, the transmission of the wavelength below the wavelength $\lambda_0$ is high, such as substantially 100%, while the transmission of the wavelength above the wavelength $\lambda_0$ is low, such as substantially 0%. That is, the first light beam 122 has a high transmission rate while the second light beam 912 has a low transmission rate (or a high reflection rate) for the dichroic mirror 110. Hence, the first light beam 122 and the second light beam 912 may have low, even substantially zero, energy loss. The transmission spectrum of the dichroic mirror 110 is illustrative only and should not limit the scope of the claimed disclosure. A person having ordinary skill in the art may select a transmission spectrum for the dichroic mirror 110 according to actual situations.

Reference is made to FIG. 1. In some embodiments, the first light beam 122 is an ultraviolet light beam, i.e., the first light source 120 is an ultraviolet light source, and the second light beam 912 is a visible light beam, such as blue light beam. However, the claimed scope of the present disclosure is not limited in this respect.

In some embodiments, the sample 910 can be a printed circuit board (PCB) or a wafer, and the wavelength converting layer thereof is a passivation (or protection) layer to protect circuits formed underneath. The optical inspection apparatus of the present embodiment can measure the thickness and/or the uniformity of the passivation layer. To measure the thickness of the passivation layer, a plurality of wavelength converting materials can be added into the passivation layer. By applying an incident light with shorter wavelength to the sample 910, the wavelength converting materials thereof can produce light with longer wavelength. The intensity of the light with longer wavelength depends on the thickness of the passivation layer, and the light distribution thereof depends on the uniformity of the passivation layer. In some embodiments, the wavelength converting materials are fluorescent materials, which may absorb light with shorter wavelength (such as ultraviolet light) and emit light with longer wavelength (such as visible light), and the claimed scope of the present disclosure is not limited in this respect.

In some embodiments, the optical inspection apparatus further includes a filter 170 disposed between the dichroic mirror 110 and the first image capturing device 130 to block the first light beam 122 while transmitting the second light beam 912. For example, the filter 170 can be disposed in front of a light receiving surface 132 of the first image capturing device 130. The filter 170 can be an ultraviolet cut filter if the first light beam 122 is ultraviolet light. Since the filter 170 can block the first light beam 122, the image detected by the first image capturing device 130 won't include the noise of the first light beam 122.

In FIG. 1, the first light source 120 provides the first light beam 122 to an inspection position 900. The sample 910 is disposed at the inspection position 900, and the first image capturing device 130 detects the second light beam 912 coming from the sample 910 disposed at the inspection position 900. In FIG. 1, the first light source 120 and the inspection position 900 form an optical axis O, and the dichroic mirror 110 is disposed in the optical axis O. Alternately, the first light source 120 and the dichroic mirror 110 form the optical axis O. The first light beam 122 propagates along the optical axis O.

In some embodiments, the first light source 120 is coaxial with the first image capturing device 130. That is, the first light source 120 and the first image capturing device 130 share at least a portion of a common light path. For example, the first light source 120 and the first image capturing device 130 share a portion of the optical axis O between the dichroic mirror 110 and the inspection position 900, and the first image capturing device 130 is disposed outside the optical axis O. With this configuration, the first light beam 122 can be normally incident on the sample 910, and the first image capturing device 130 can detect the normal light (i.e., the second light beam 912) reflected from the sample 910. According to the Fresnel equation, normal light has a more steady (or lower) reflection rate than oblique light. Hence, the coaxial configuration can further decrease the energy loss of the first light beam 122 and the second light beam 912.

In some embodiments, the first image capturing device 130 is a color camera and has a modulation transfer function (MTF). The module (or magnitude) of the MTF is in a range of about 30% to about 100% at about 50 lp/mm (line pairs per mm) (corresponding to about 10 µm of resolution) to about 25 lp/mm (corresponding to about 20 µm of resolution). For example, the module of the MTF is greater than 30% at about 33.3 lp/mm (corresponding to about 15 µm). The color camera may include a light sensor and a color filter disposed in front of the light sensor, and the claimed scope of the present disclosure is not limited in this respect. With this configuration, the resolution of the first image capturing device 130 is high enough to determine the intensity of the second light beam 912 of the detected image, but not too high that the background of the detected image is highlighted.

In some other embodiments, the first image capturing device 130 is a monochrome camera and has a modulation transfer function (MTF). The module of the MTF is in a range of about 30% to about 100% at about 20 lp/mm (corresponding to about 25 µm of resolution) to about 14.2 lp/mm (corresponding to about 35 µm of resolution). For example, the module of the MTF is greater than 30% at about 16.7 lp/mm (corresponding to about 30 µm). In some embodiments, the monochrome camera is a light sensor to detect the intensity of light and show an image with gray scale. With this configuration, the resolution of the first image capturing device 130 is high enough to determine the intensity of the second light beam 912 of the detected image, but not too high that the background of the detected image is highlighted.

Figure 3:
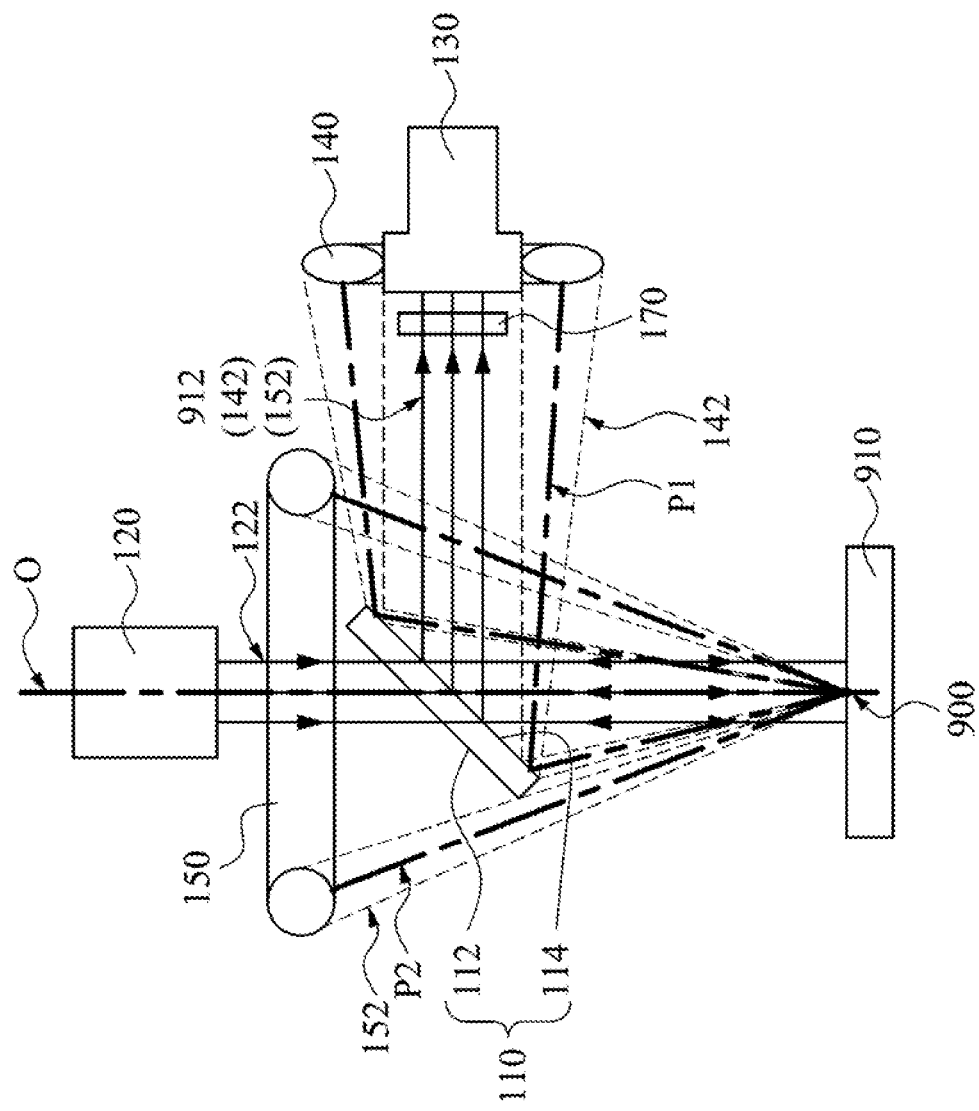
FIG. 3 is a schematic diagram of an optical inspection apparatus according to another embodiment of the present disclosure.

FIG. 3 is a schematic diagram of an optical inspection apparatus according to another embodiment of the present disclosure. The difference between the optical inspection apparatuses of FIGS. 3 and 1 is the presence of a second light source 140 and a third light source 150. In FIG. 3, the optical inspection apparatus further includes the second light source 140 configured to provide a third light beam 142 to the inspection position 900 along a path P1 in which the dichroic mirror 110 disposed. In addition, the dichroic mirror 110 further reflects the third light beam 142. The third light beam 142 can have a wavelength different from the first light beam 122 and the second light beam 912. For example, the first light beam 122 is ultraviolet light, the second light beam 912 is blue light, and the third light beam 142 is red light or yellow light, i.e., the second light source 140 is a visible light source. The filter 170 transmits the third light beam 142 as well, and the first image capturing device 130 further detects the third light beam 142. For clarity, FIG. 3 depicts edges of the third light beam 142.

The third light beam 142 emitted from the second light source 140 is reflected by the dichroic mirror 110 and impinges on the sample 910 along the path P1. The sample 910 reflects at least a portion of the third light beam 142, which propagates back to the dichroic mirror 110, passes through the filter 170, and is detected by the first image capturing device 130.

The third light beam 142 can highlight the signal of the second light beam 912. In greater detail, in some embodiments, the second light beam 912 and the third light beam 142 can be far apart on the color spectrum to form a high contrast. Hence, the second light beam 912 can be highlighted in the image detected by the first image capturing device 130, and the signal of the passivation layer of the sample 910 is more apparent.

In some embodiments, the second light source 140 is an annular light source, as shown in FIG. 3, and the second light source 140 is disposed around the first image capturing device 130. That is, the third light beam 142 is obliquely incident on the sample 910. For clarity, FIG. 3 depicts semi-circle of the second light source 140. However, in some other embodiments, the second light source 140 can be a point light source, and the claimed scope of the present disclosure is not limited in this respect.

In some embodiments, the optical inspection apparatus further includes the third light source 150 configured to provide a fourth light beam 152 to the inspection position 900 along a path P2 spaced from the dichroic mirror 110. That is, the dichroic mirror 110 does not block the fourth light beam 152 emitted by the third light source 150. For clarity, FIG. 3 depicts edges of the fourth light beam 152. The fourth light beam 152 can have a wavelength different from the first light beam 122, the second light beam 912, and the third light beam 142. For example, the first light beam 122 is ultraviolet light, the second light beam 912 is blue light, the third light beam 142 is red light, and the fourth light beam 152 is yellow light, i.e., the third light source 150 is a visible light source. The dichroic mirror 110 can further reflect the fourth light beam 152, the filter 170 transmits the fourth light beam 152 as well, and the first image capturing device 130 further detects the fourth light beam 152. In some embodiments, the second light beam 912 and the fourth light beam 152 can be far apart on the color spectrum to form high contrast. Hence, the second light beam 912 can be highlighted in the image detected by the first image capturing device 130, and the signal of the passivation layer of the sample 910 is more apparent.

In some embodiments, the third light source 150 is an annular light source, as shown in FIG. 3, and the third light source 150 is disposed around the optical axis O formed of the first light source 120 and the inspection position 900 (and/or the dichroic mirror 110). That is, the fourth light beam 152 is obliquely incident the sample 910. For clarity, FIG. 3 depicts semi-circle of the third light source 150. However, in some other embodiments, the third light source 150 can be a point light source, and the claimed scope of the present disclosure is not limited in this respect. Other relevant structural details of the optical inspection apparatus in FIG. 3 are similar to the optical inspection apparatus of FIG. 1, and, therefore, a description in this regard will not be repeated hereinafter.

Figure 4:
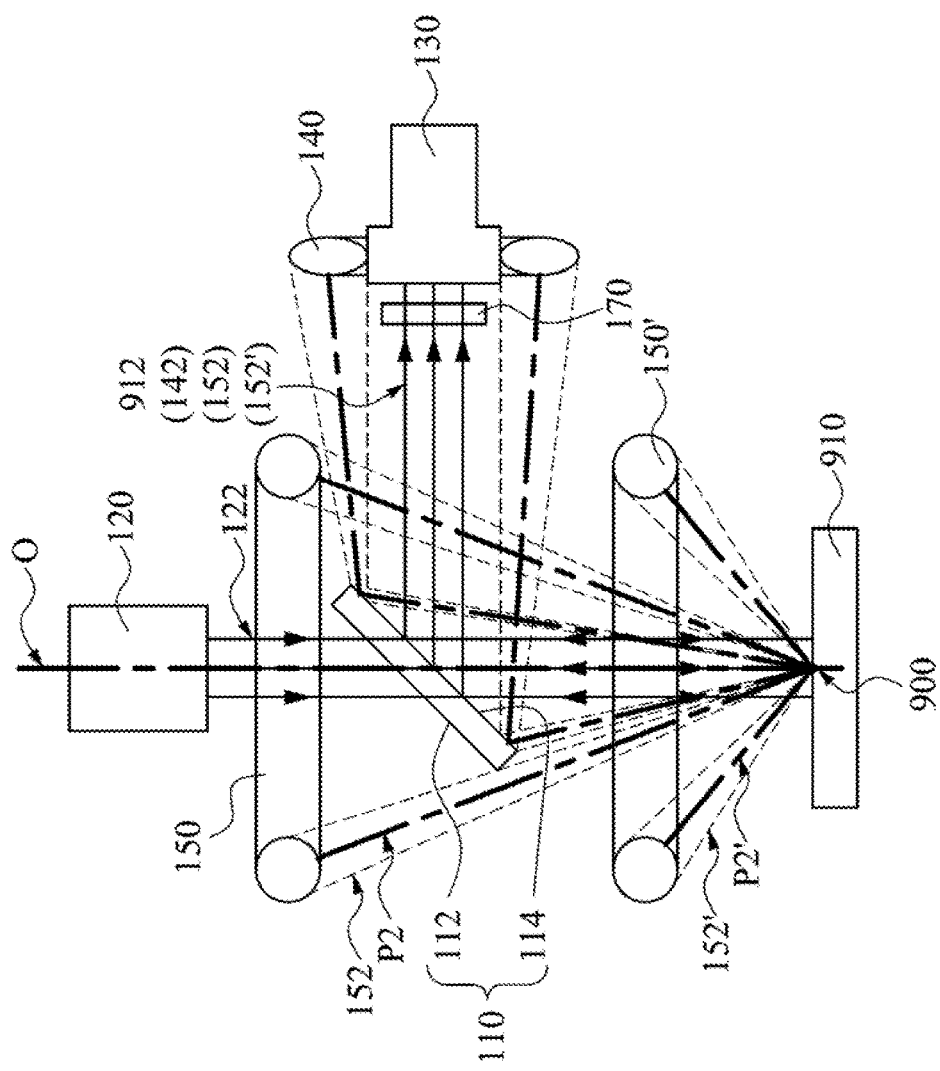
FIG. 4 is a schematic diagram of an optical inspection apparatus according to yet another embodiment of the present disclosure.

FIG. 4 is a schematic diagram of an optical inspection apparatus according to yet another embodiment of the present disclosure. The difference between the optical inspection apparatus of FIGS. 3 and 4 is the number of the third light source(s). In FIG. 4, there are plural third light sources. For example, there are two third light sources 150 and 150'. The two third light sources 150 and 150' can be annular light sources, and disposed around the optical axis O formed of the first light source 120 and the inspection position 900 (and/or the dichroic mirror 110). The fourth light beams 152 and 152' can have different wavelengths. The fourth light beam 152 propagates along the path P2, and the fourth light beam 152' propagates along a path P2' spaced from the path P2. That is, the dichroic mirror 110 and third light source 150' do not block the fourth light beam 152, and the dichroic mirror 110 and third light source 150 do not block the fourth light beam 152'. Other relevant structural details of the optical inspection apparatus in FIG. 4 are similar to the optical inspection apparatus of FIG. 3, and, therefore, a description in this regard will not be repeated hereinafter.

Figure 5:
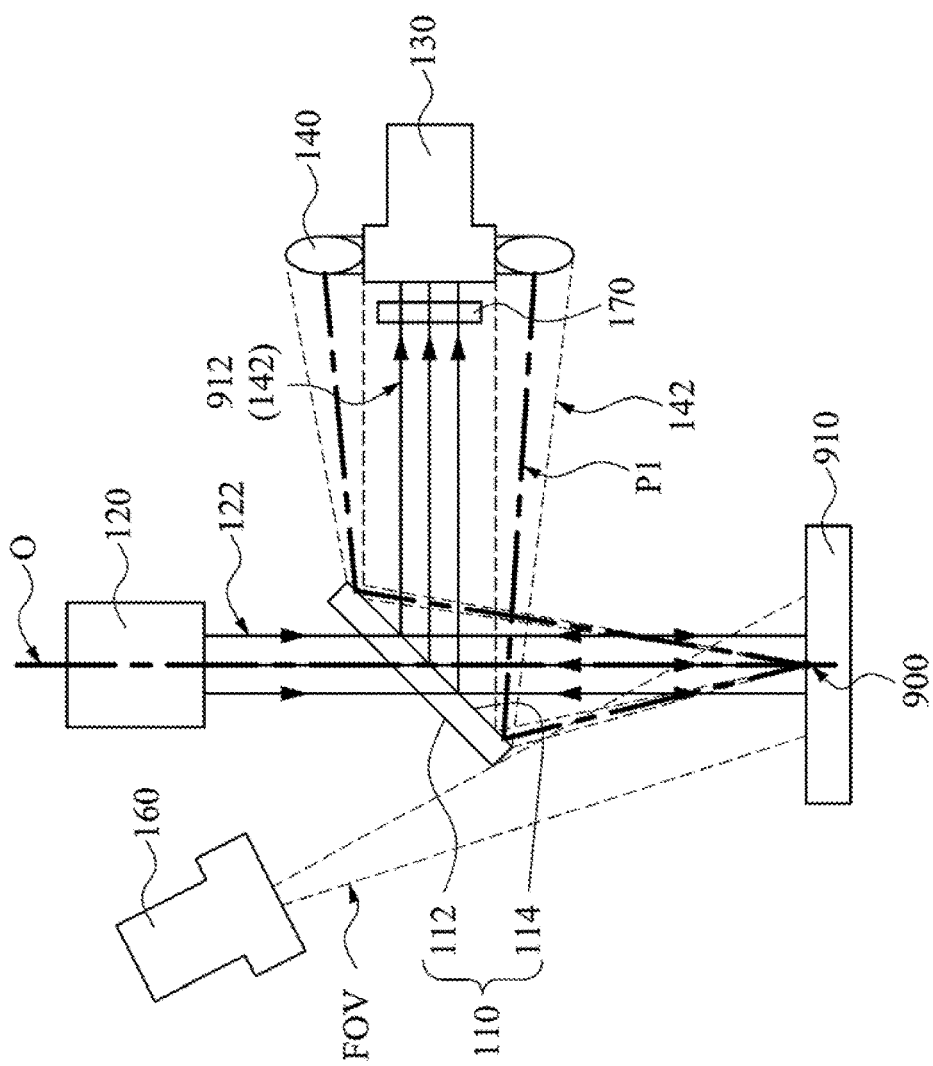
FIG. 5 is a schematic diagram of an optical inspection apparatus according to still another embodiment of the present disclosure.

FIG. 5 is a schematic diagram of an optical inspection apparatus according to still another embodiment of the present disclosure. The difference between the optical inspection apparatuses of FIGS. 3 and 5 is the configuration of the third light source. In FIG. 5, the third light source 150 of FIG. 3 is replaced with a second image capturing device 160. The second image capturing device 160 is configured to obliquely capture an image of the inspection position 900 (or the sample 910). The second image capturing device 160 has a field of view FOV uncovering at least a portion of the dichroic mirror 110 and at least a portion of the first image capturing device 120. That is, the second image capturing device 160 does not capture entire images of the dichroic mirror 110 and the first image capturing device 120. Since the second image capturing device 160 obliquely captures the image of the inspection position 900 (or the sample 910), some features hardly captured from normal angle (such as the light intensity of a portion of the passivation layer disposed on sidewalls of the circuits of the sample 910) can be captured by the second image capturing device 160. In some other embodiments, the third light source 150' of FIG. 4 can be added into the optical inspection apparatus of FIG. 5, or the third light source 150' of FIG. 4 can be replaced with the second image capturing device 160, and the claimed scope is not limited in this respect. In some embodiments, the second image capturing device 160 can be plural. In some embodiments, the second image capturing device 160 is a color camera and has a modulation transfer function (MTF). The module of the MTF is in a range of about 30% to about 100% at about 50 lp/mm (corresponding to about 10 μm of resolution) to about 25 lp/mm (corresponding to about 20 μm of resolution). For example, the module of the MTF is greater than 30% at about 33.3 lp/mm (corresponding to about 15 μm). In some other embodiments, the second image capturing device 160 is a monochrome camera and has a modulation transfer function (MTF). The module of the MTF is in a range of about 30% to about 100% at about 20 lp/mm (corresponding to about 25 μm of resolution) to about 14.2 lp/mm (corresponding to about 35 μm of resolution). For example, the module of the MTF is greater than 30% at about 16.7 lp/mm (corresponding to about 30 μm). Other relevant structural details of the optical inspection apparatus in FIG. 5 are similar to the optical inspection apparatus of FIG. 3, and, therefore, a description in this regard will not be repeated hereinafter.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure covers modifications and variations of this disclosure provided they fall within the scope of the following claims.

What is claimed is:

1. An optical inspection apparatus having an inspection position, the optical inspection apparatus comprising:
   an ultraviolet light source configured to provide an ultraviolet light beam to a sample at the inspection position;
   a dichroic mirror disposed between the ultraviolet light source and the sample at the inspection position;
   a first image capturing device laterally aligned with the dichroic mirror, wherein the first image capturing device is a color camera and has a modulation transfer function (MTF) with a module in a range of about 30% to about 100% at about 50 lp/mm to about 25 lp/mm, or the first image capturing device is a monochrome camera and has a modulation transfer function (MTF) with a module in a range of about 30% to about 100% at about 20 lp/mm to about 14.2 lp/mm; and
   an annular visible light source disposed around the first image capturing device and configured to provide a first visible light beam obliquely incident onto the sample at the inspection position, wherein a wavelength of the first visible light beam is longer than a wavelength of the ultraviolet light beam;
   wherein when the optical inspection apparatus is operated to inspect the sample at the inspection position, the dichroic mirror collects the ultraviolet light beam from the ultraviolet light source and transmits the ultraviolet light beam from the ultraviolet light source to the sample, the dichroic mirror collects the first visible light beam from the annular visible light source and reflects the first visible light beam to the sample, and then the sample reflects the first visible light beam and a second visible light beam that is converted from the ultraviolet light beam to the dichroic mirror, and the dichroic mirror reflects the reflected second visible light beam and the reflected first visible light beam to the first image capturing device,
   the dichroic mirror having a first transmission at the wavelength of the ultraviolet light beam and a second transmission at a wavelength of the second visible light beam, wherein the first transmission is greater than the second transmission, and the wavelength of the second visible light beam is longer than the wavelength of the ultraviolet light beam.

2. The optical inspection apparatus of claim 1, wherein the ultraviolet light source is coaxial with the first image capturing device.

3. The optical inspection apparatus of claim 1, wherein the dichroic mirror is a band-pass filter or a short-pass filter.

4. The optical inspection apparatus of claim 1, further comprising:
   a filter disposed between the dichroic mirror and the first image capturing device to block the ultraviolet light beam while transmits the second visible light beam.

5. The optical inspection apparatus of claim 1, wherein the first visible light beam to the inspection position is along a path in which the dichroic mirror disposed.

6. The optical inspection apparatus of claim 1, further comprising:
   a second image capturing device configured to obliquely capture an image of the inspection position, wherein the second image capturing device has a field of view uncovering at least a portion of the dichroic mirror and at least a portion of the first image capturing device.

7. An optical inspection apparatus having an inspection position, the optical inspection apparatus comprising:
   an ultraviolet light source providing an ultraviolet light beam to a sample at the inspection position, wherein the ultraviolet light source and the inspection position form an optical axis;
   a dichroic mirror disposed in the optical axis; and
   a first image capturing device disposed outside the optical axis, laterally aligned with the dichroic mirror, and coaxial with the ultraviolet light source, wherein the first image capturing device is a color camera and has a modulation transfer function (MTF) with a module in a range of about 30% to about 100% at about 50 lp/mm to about 25 lp/mm, or the first image capturing device is a monochrome camera and has a modulation transfer function (MTF) with a module in a range of about 30% to about 100% at about 20 lp/mm to about 14.2 lp/mm; and
   a first annular visible light source disposed around the first image capturing device and configured to provide a first visible light beam obliquely incident onto the sample at the inspection position, wherein a wavelength of the first visible light beam is longer than a wavelength of the ultraviolet light beam
   wherein when the optical inspection apparatus is operated to inspect the sample at the inspection position, the dichroic mirror collects the ultraviolet light beam from the ultraviolet light source and transmits the ultraviolet light beam from the ultraviolet light source to the sample, and the dichroic mirror collects the first visible light beam from the first annular visible light source and reflects the first visible light beam to the sample, the sample reflects the first visible light beam and a second visible light beam that is converted from the ultraviolet light beam to the dichroic mirror, and the dichroic mirror reflects the reflected second visible light beam and the reflected first visible light beam to the first image capturing device,
   the dichroic mirror having a first transmission at the wavelength of the ultraviolet light beam and a second transmission at a wavelength of the second visible light beam, wherein the first transmission is greater than the second transmission, and the wavelength of the second visible light beam is longer than the wavelength of the ultraviolet light beam.

8. The optical inspection apparatus of claim 7, further comprising a second annular visible light source configured to provide a third visible light beam to the inspection position, wherein the second annular visible light source is disposed between the ultraviolet light source and the inspection position, and a path of the third visible light beam is spaced from the dichroic mirror.

9. The optical inspection apparatus of claim 7, further comprising a second image capturing device configured to capture an image of the inspection position, wherein the second image capturing device has a field of view uncovering at least a portion of the dichroic mirror, at least a portion of the first image capturing device, and at least a portion of the first annular visible light source.

* * * * *